United States Patent
Davis et al.

(10) Patent No.: US 8,538,010 B2
(45) Date of Patent: Sep. 17, 2013

(54) FACEPLATE ASSEMBLY FOR WALL MOUNTING A PHONE

(75) Inventors: Brian K. Davis, Winston-Salem, NC (US); Greg Garrett, Lexington, NC (US); Gary Bowman, Lexington, NC (US); Robert Ashby, Greensboro, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 596 days.

(21) Appl. No.: 12/767,322

(22) Filed: Apr. 26, 2010

(65) Prior Publication Data

US 2011/0261952 A1    Oct. 27, 2011

(51) Int. Cl.
*H04M 1/00* (2006.01)
*H04M 9/00* (2006.01)

(52) U.S. Cl.
USPC ............................................ 379/454; 379/435

(58) Field of Classification Search
USPC ................. 379/435, 438, 441, 442, 447, 454, 379/457; 174/66, 263; 439/639, 677
See application file for complete search history.

(56) References Cited

U.S. PATENT DOCUMENTS

| | | | |
|---|---|---|---|
| 5,621,788 A * | 4/1997 | Eiken | 379/147 |
| 5,638,481 A | 6/1997 | Arnett | |
| 5,659,650 A | 8/1997 | Arnett | |
| D443,252 S | 6/2001 | Clapp, Jr. et al. | |
| 6,616,005 B1 | 9/2003 | Periera et al. | |
| 2003/0035535 A1* | 2/2003 | Kiko et al. | 379/419 |
| 2004/0022387 A1* | 2/2004 | Weikle | 379/442 |

OTHER PUBLICATIONS

Amp Netconnect "2000 Product Catalog"; Tyco Electronics Corporation, p. 2.27; 2000.

* cited by examiner

*Primary Examiner* — Tuan D Nguyen (57) ABSTRACT

A faceplate assembly includes a cover plate having a front wall and a rim surrounding a perimeter of the front wall. The rim has a rim opening therethrough. The front wall has a pair of mounting posts extending therefrom that are configured to be received in keyholes of a phone to support the phone. A subplate configured to be mounted to a wall outlet. The subplate has an end wall and a base with a base opening therethrough and the subplate is configured to hold a modular jack. The cover plate is coupled to the subplate such that the rim and base openings are aligned with one another and are configured to receive a patch cord therethrough.

20 Claims, 5 Drawing Sheets

FIG. 5

FACEPLATE ASSEMBLY FOR WALL MOUNTING A PHONE

BACKGROUND OF THE INVENTION

The subject matter herein relates generally to phone systems, and more particularly, to faceplate assemblies for wall mounting a phone.

Internet Protocol (IP) phone systems are in wide use. Such IP phone systems include an IP phone as well as a patch cord which connects the IP phone to a modular jack at a wall outlet. The IP phone typically includes a modular jack near a bottom of the IP phone, as opposed to at a central location on the phone, which is typical of standard phones. Additionally, the patch cord used to connect the phone and the wall outlet is typically thicker than a standard phone cord, which makes the patch cord more difficult to work with and manipulate to route from the wall outlet to the modular jack of the IP phone.

In some applications, it is desirable to wall mount the IP phone, rather than having the IP phone on a desk or table near the wall outlet. The wall outlet typically includes a faceplate holding the modular jack. The faceplate includes mounting posts, to which the phone is mounted. Wall mounting of standard phones is relatively simple, as the phone cord is easily manipulated and routed from a center of faceplate to the area of the phone having the modular jack. However, with IP phones, conventional wall mounting techniques and designs have proven difficult. For example, because the patch cords are difficult to manipulate, it has heretofore been difficult to route the patch cords from the center of the faceplate to the modular jack of the IP phone. Additionally, because the patch cords are thicker, the bend radius of the patch cords requires a predetermined amount of space in front of the faceplate to route the patch cord. Kinking of the patch cord is a problem when trying to route the patch cords in a tight space. Furthermore, because the patch cords have longer plugs, less space is provided between the plug and the IP phone for manipulating the patch cord. As such, existing solutions for wall mounting IP phones have provided mounting hardware that forces the IP phone to be mounted a distance away from the faceplate, which positions the IP phone further from the wall, which is less desirable than having the phone substantially flush with the wall. Other solutions have incorporated multiple faceplates, with one faceplate having the patch cord extending therefrom, and the other faceplate having the IP phone mounted thereto. However, such solution requires additional wall space and has a less desirable aesthetic appeal to the end user.

A need remains for an IP phone system that may be wall mounted in a cost effective and reliable manner. A need remains for a faceplate assembly that allows for wall mounting of an IP phone generally flush with the wall.

BRIEF DESCRIPTION OF THE INVENTION

In one embodiment, a faceplate assembly is provided including a cover plate having a front wall and a rim surrounding a perimeter of the front wall. The rim has an opening therethrough. The front wall has a pair of mounting posts extending therefrom that are configured to be received in keyholes of a phone to support the phone. A subplate configured to be mounted to a wall outlet. The subplate has an end wall and a base with an opening therethrough and the subplate is configured to hold a modular jack. The cover plate is coupled to the subplate such that the rim and base openings are aligned with one another and are configured to receive a patch cord therethrough.

In another embodiment, an internet protocol (IP) phone system is provided including a modular jack, a patch cord configured to be coupled to the modular jack, and a faceplate assembly configured to be mounted to a wall outlet. The faceplate assembly includes a subplate configured to be mounted to the wall outlet. The subplate has an end wall and a base with an opening therethrough, where the subplate holds the modular jack. A cover plate is coupled to the subplate. The cover plate has a front wall and a rim surrounding a perimeter of the front wall that has an opening therethrough. The front wall has a pair of mounting posts extending therefrom that are configured to be received in keyholes of an IP phone to support the IP phone. The rim opening is aligned with the base opening such that the rim and base openings receive the patch cord therethrough.

DETAILED DESCRIPTION OF THE INVENTION

Figure 1:
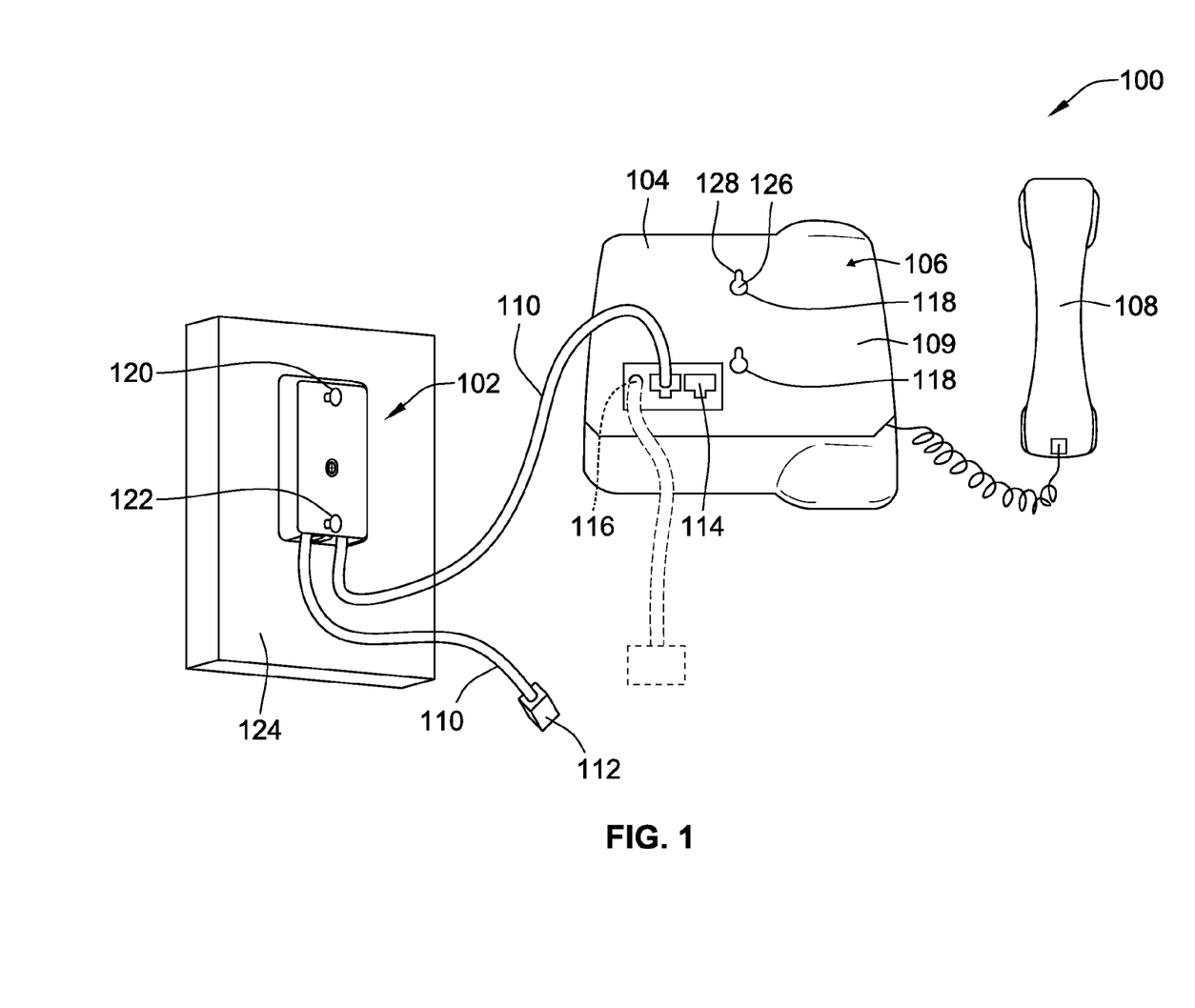
FIG. 1 is a front perspective view of a wall mounted IP phone system having a faceplate assembly formed in accordance with an exemplary embodiment.

FIG. 1 is a front perspective view of a wall mounted IP phone system 100 having a faceplate assembly 102 formed in accordance with an exemplary embodiment. The IP phone system 100 includes an IP phone 104 using voice over IP technology. The IP phone 104 includes a base 106 and a handset 108. The base 106 has a back surface 109. The IP phone 104 is connected to a communication system by one or more patch cords 110. The patch cords 110 includes modular plugs 112 at ends thereof that are received in corresponding modular jacks 114 of the IP phone 104. The modular jacks 114 are provided in the back surface 109. Optionally, the IP phone 104 may include a power connector 116 configured to be coupled to a power source to power the IP phone 104.

The IP phone 104 includes keyholes 118 in the back surface 109 that allow the IP phone 104 to be mounted to the faceplate assembly 102. For example, mounting posts 120, 122 of the faceplate assembly 102 are loaded into the keyholes 118. The mounting posts 120, 122 are captured in the keyholes 118 to secure the IP phone 104 to the faceplate assembly 102, and thus wall mount the IP phone 104 to a wall 124. The wall 124 is oriented generally vertically. The wall 124 may be of typically drywall and stud construction, or may be a modular wall, such as typical in office furniture. Other wall structures are possible. In the illustrated embodiment, each keyhole 118 includes a loading portion 126 and a locking portion 128. The loading portions 126 of the keyholes 118 are initially mounted onto the mounting posts 120, 122. The IP phone 104 is then lowered downward such that the locking portions 128 are loaded onto the mounting ports 120, 122.

Figure 2:
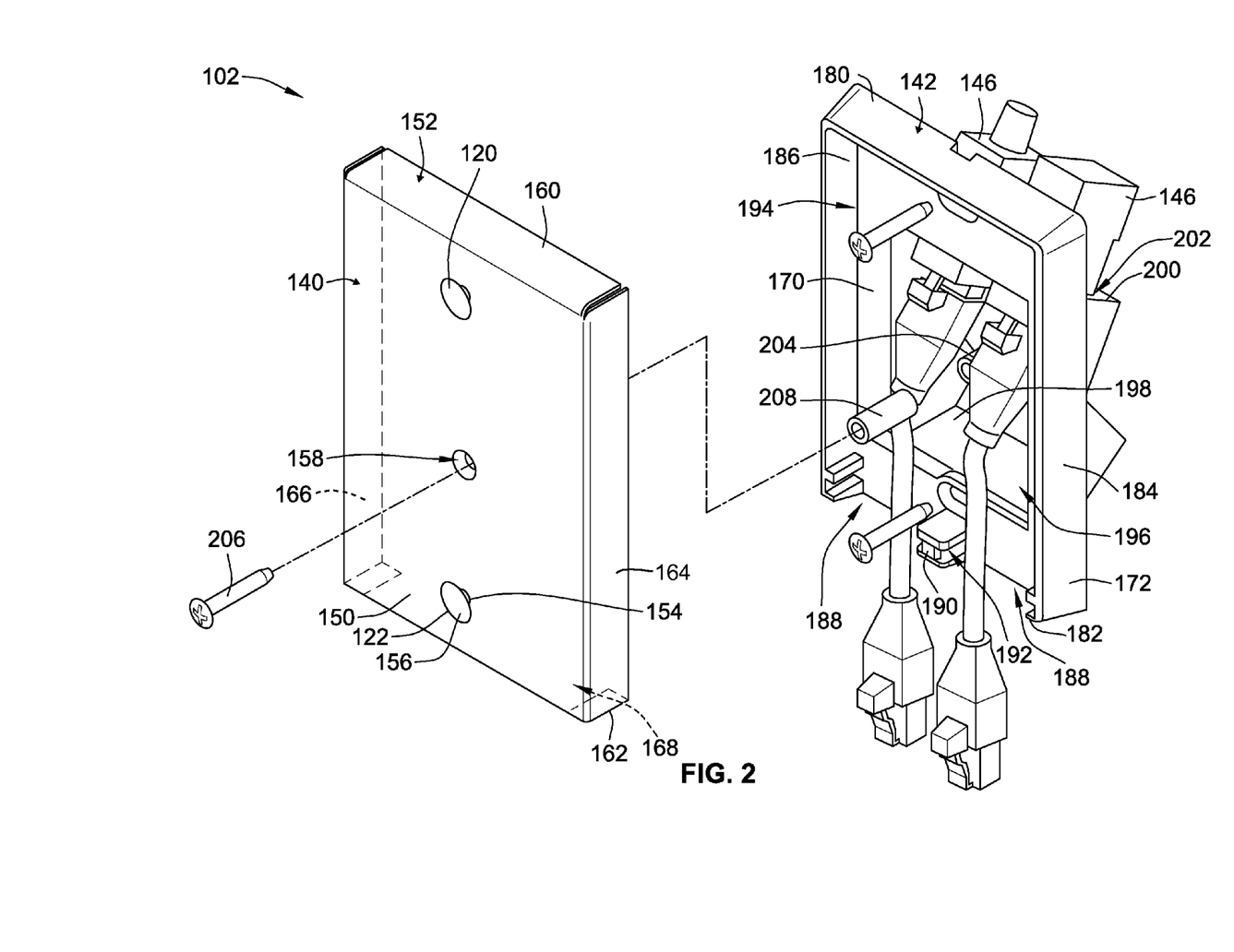
FIG. 2 is an exploded view of the faceplate assembly shown in FIG. 1.

FIG. 2 is an exploded view of the faceplate assembly 102. The faceplate assembly 102 includes a cover plate 140 and a subplate 142. The subplate 142 is configured to be mounted to the wall 124 (shown in FIG. 1). The subplate 142 may be mounted to a receptacle box 144 (shown in FIG. 3) mounted to the wall 124. The subplate 142 holds one or more modular jacks 146 that are configured to receive a plug of the corresponding patch cord 110 (shown in FIG. 1).

The cover plate 140 includes a front wall 150 and a rim 152 surrounding a perimeter of the front wall 150. The front wall 150 is generally planar and is rectangular in shape, however other shapes are possible in alternative embodiments. The mounting posts 120, 122 extend forward from the front wall 150. The mounting posts 120, 122 are configured to be received in the keyholes 118 (shown in FIG. 1) and include posts 154 and heads 156 located at ends of the posts 154. The heads 156 are larger than the posts 154. The mounting posts 120, 122 are spaced apart from one another and provided proximate to a top and a bottom, respectively, of the front wall 150 and may be spaced apart by a standard distance common to the telephone industry. The mounting posts 120, 122 are substantially centered between the sides of the front wall 150. The cover plate 140 includes a fastener bore 158 therethrough. The fastener bore 158 is substantially centrally located on the front wall 150. The fastener bore 158 faces outward away from the wall plane of the wall 124 (shown in FIG. 1).

The rim 152 extends rearward from the front wall 150 and includes a top 160, a bottom 162 and opposite sides 164, 166. The rim 152 may be generally perpendicular with respect to the front wall 150. The rim 152 includes a rim opening 168 through the bottom 162. The rim opening 168 is downward facing in a direction along the wall plane of the wall 124 when mounted thereto. Alternatively, the rim opening 168 may be provided along other portions of the rim, such as along the top 160 or the sides 164, 166, wherein the rim opening 168 faces in an upward direction or an outward direction along the wall plane. The rim opening 168 may extend across a majority of the bottom 162. The rim opening 168 may extend substantially entirely across the bottom 162.

The subplate 142 includes an end wall 170 and a lip 172 surrounding a perimeter of the end wall 170. The end wall 170 is generally planar and is rectangular in shape, however other shapes are possible in alternative embodiments. The lip 172 extends forward from the end wall 170 and includes a top 180, a base 182 and opposite sides 184, 186. The lip 172 may be generally perpendicular with respect to the end wall 170. The base 182 defines a bottom portion of the lip 172 and extends between the sides 184, 186.

The lip 172 includes one or more base openings 188 through the base 182. The base openings 188 face downward in a direction along the wall plane of the wall 124 when mounted thereto. Alternatively, the base openings 188 may be provided along other portions of the lip, such as along the top 180 or the sides 184, 186, wherein the base openings 188 face in an upward direction or an outward direction along the wall plane. The base openings 188 are separated by a stem 190 having slots 192 formed therein. The stem 190 is substantially centered between the sides 184, 186 such that the base openings 188 are approximately the same size. The base openings 188 are configured to receive the patch cords 110 therethrough. Alternatively, the base openings 188 may receive other types of connectors, such as a fiber optic connector, therein. The base openings 188 provide access to the interior of the faceplate assembly 102.

The subplate 142 includes a chamber 194 defined by the lip 172 and the end wall 170. The chamber 194 is positioned forward of the end wall 170. The chamber 194 provides a routing space for routing the patch cords 110 from the modular jack 146 to the base openings 188 in the base 182.

The end wall 170 includes an end wall opening 196 therethrough. The end wall opening 196 is substantially centered on the end wall 170. The end wall 170 includes a bracket 198 aligned with, and rearward of, the end wall 170. The bracket 198 supports the modular jacks 146. The bracket 198 recesses the modular jack 146 behind the end wall 170. The bracket 198 has at least one mount wall 200 with at least one jack opening 202 therethrough. Each jack opening 202 is configured to receive a corresponding modular jack 146. In the illustrated embodiment, two mount walls 200 are provided. Each mount wall 200 includes a single jack opening 202, thus providing two jack openings 202 that receive two modular jacks 146. In alternative embodiments, more or less than two mount walls 200 may be provided. Each mount wall 200 may include any number of jack openings 202 for receiving corresponding modular jacks 146. In the illustrated embodiment, the mount walls 200 are angled non-parallel with respect to the end wall 170 to angle the modular jacks 146 with respect to the end wall 170. For example, the modular jacks 146 may be angled at least partially downward toward the base openings 188 for easy routing of the patch cords 110 to the modular jacks 146.

The subplate 142 includes a securing feature 204. A fastener 206 is used to secure the cover plate 140 to the subplate 142. For example, the fastener 206 may be a threaded fastener, and the securing feature 204 may be a threaded bore. When the fastener 206 is coupled to the securing feature 204, the cover plate 140 is coupled to the subplate 142. Optionally, a spacer 208 may be provided between the cover plate 140 and the securing feature 204 for structural support of the cover plate 140. In the illustrated embodiment, the securing feature 204 is provided on the bracket 198. Other locations are possible in alternative embodiments, such as the end wall 170. Other types of securing means are possible in alternative embodiments to secure the cover plate 140 to the subplate 142, such as latches, a rail system, clips, and the like. In an exemplary embodiment, the fastener 206 is secured to the cover plate 140 and the subplate 142 at a central location of the faceplate assembly 102. Other locations are possible in alternative embodiments.

Figure 3:
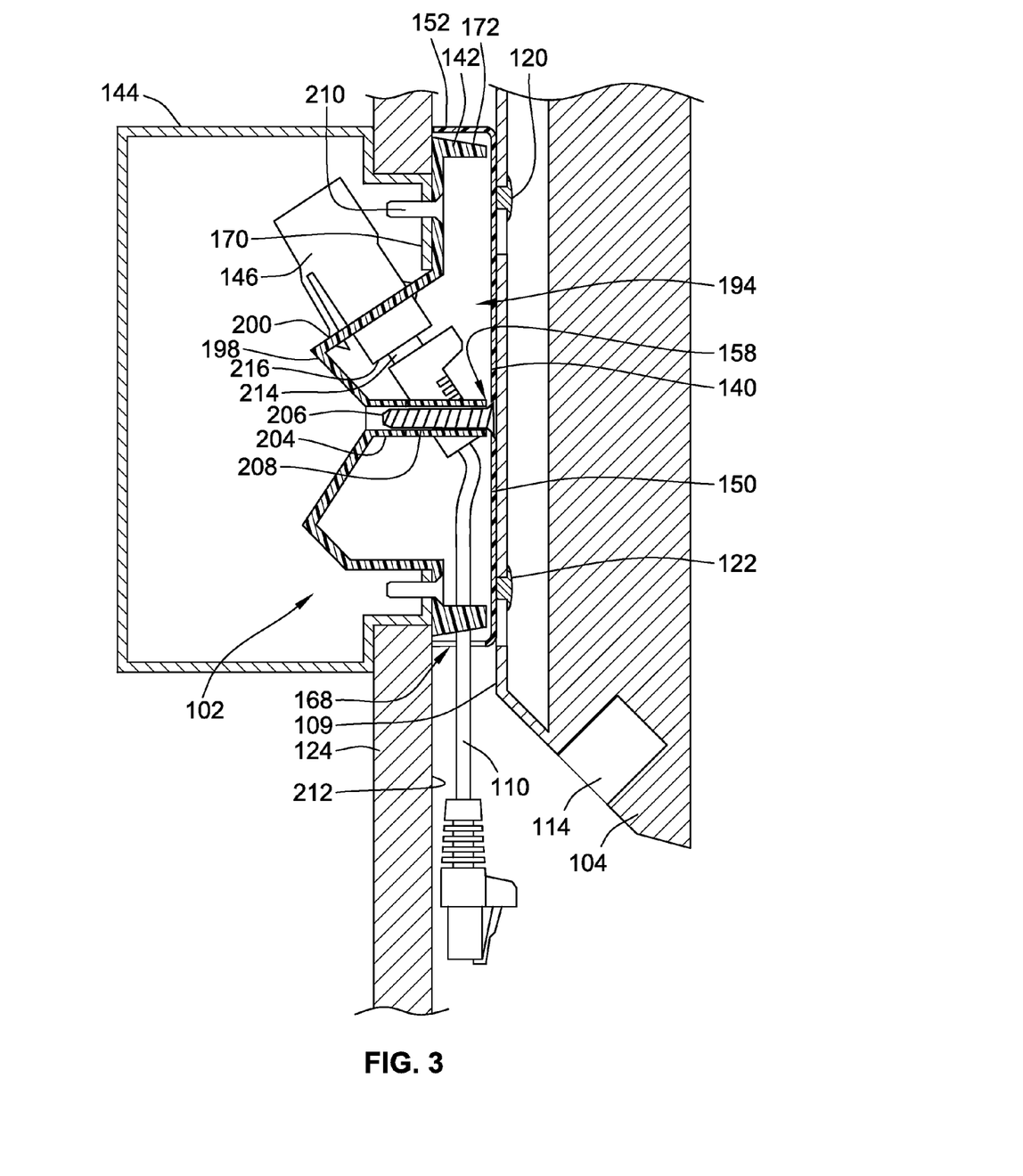
FIG. 3 is a side sectional view of the faceplate assembly shown in FIG. 1.

FIG. 3 is a side sectional view of the faceplate assembly 102 illustrating the subplate 142 mounted to a receptacle box 144 in the wall 124. The cover plate 140 is illustrated in a mated state. The receptacle box 144 is a metal box that is mounted on an interior of the wall 124. Cables (not shown) are routed through the wall 124 to the receptacle box 144 and terminated to the modular jacks 146.

The subplate 142 is mounted to the receptacle box 144 using fasteners 210. Alternative fastening means are possible in alternative embodiments. The end wall 170 of the subplate 142 generally rests on top of an exterior surface 212 of the wall 124. The lip 172 extends forward from the end wall 170 and the chamber 194 is positioned forward of the wall 124.

The bracket 198 extends rearward from the end wall 170 and is received in the receptacle box 144. The bracket 198 is recessed from the end wall 170. The bracket 198 supports the modular jacks 146 and recesses the modular jacks 146 behind the end wall 170. In an exemplary embodiment, the modular jacks 146 are recessed behind the exterior surface 212 of the wall 124. The mount walls 200 are angled with respect to the end wall 170 such that the mount walls 200 are oriented non-parallel with respect to the end wall 170. Optionally, the mount walls 200 may be oriented at different angles with respect to the end wall 170. The mount walls 200 may generally face the base openings 188 (shown in FIG. 2). As such, the patch cords 110 may be routed from the modular jacks 146 to the base openings 188 while maintaining proper cable dress and bend radius for the patch cords 110. In the illustrated embodiment, the patch cords 110, and corresponding modular plugs 214, are loaded into the modular jacks 146 at an angle that is non-perpendicular to the end wall 170. For example, mating interfaces 216 of the modular jacks 146 may be oriented non-perpendicular with respect to the end wall 170, and the modular plugs 214 are loaded through the mating interfaces 216 during mating. The chamber 194 provides a space for the patch cords 110 to be routed to the base openings 188. The patch cords 110 project from the faceplate assembly 102 outward along the wall 124. The patch cords 110 exit the rim and base openings 168, 188 in a direction generally parallel to the wall plane of the wall 124. In the illustrated embodiment, the rim and base openings 168, 188 are provided at the bottom of the faceplate assembly 102 such that the patch cords 110 project downward from the faceplate assembly 102 along the wall 124. Alternatively, the patch cords 110 could project upward along the wall or outward along the wall in alternative embodiments, such as when the rim and base openings 168, 188 are located in different locations.

During assembly, once the subplate 142 is mounted to the receptacle box 144 and the patch cords 110 are coupled to the modular jacks 146, the cover plate 140 may be coupled to the subplate 142. The fastener 206 is loaded through the fastener bore 158 and the spacer 208, and is aligned with the securing feature 204. The fastener 206 is coupled to the securing feature 204 to secure the cover plate 140 to the subplate 142. When the cover plate 140 is coupled to the subplate 142, the rim 152 surrounds the lip 172. The rim opening 168 is aligned with the base openings 188. The patch cords 110 pass through both the rim opening 168 and the base openings 188. The cover plate 140 covers the chamber 194 and provides a finished face for the faceplate assembly 102.

The mounting posts 120, 122 extend from the finished face of the cover plate 140 for receiving the IP phone 104. When the IP phone 104 is mounted to the cover plate 140, the faceplate assembly 102 supports the IP phone 104 and allows the IP phone 104 to be wall mounted. The IP phone 104 is mounted such that the back surface 109 is generally flush with the exterior surface 212 of the wall 124. For example, the back surface 109 may only be spaced from the wall 124 by the thickness of the faceplate assembly 102. The back surface 109 is generally coplanar with the front wall 150 of the cover plate 140 when mounted thereto. The IP phone 104 is configured to be mounted to the mounting posts 120, 122 without the need for additional hardware or mounting brackets external of, and in addition to, the faceplate assembly 102. Rather, the IP phone 104 is directly connected to the faceplate assembly 102. The faceplate assembly 102 has a relatively thin or low profile from the exterior surface 212 of the wall 124. For example, the faceplate assembly 102 has a thickness approximately equal to a thickness of the patch cords 110. For example, the chamber 194 is sized to accommodate the patch cords 110, and route the patch cords directly through the bottom of the faceplate assembly 102. Additionally, by having the patch cords 110 routed through the bottom of the faceplate assembly 102, the patch cords 110 are positioned at the base of the IP phone 104, which is the location of the modular jacks 114 of the IP phone 104. The IP phone 104 may sit flush with the front wall 150, as opposed to having to be elevated off the front wall 150 to accommodate routing of patch cords 110 through the front wall 150.

Figure 4:
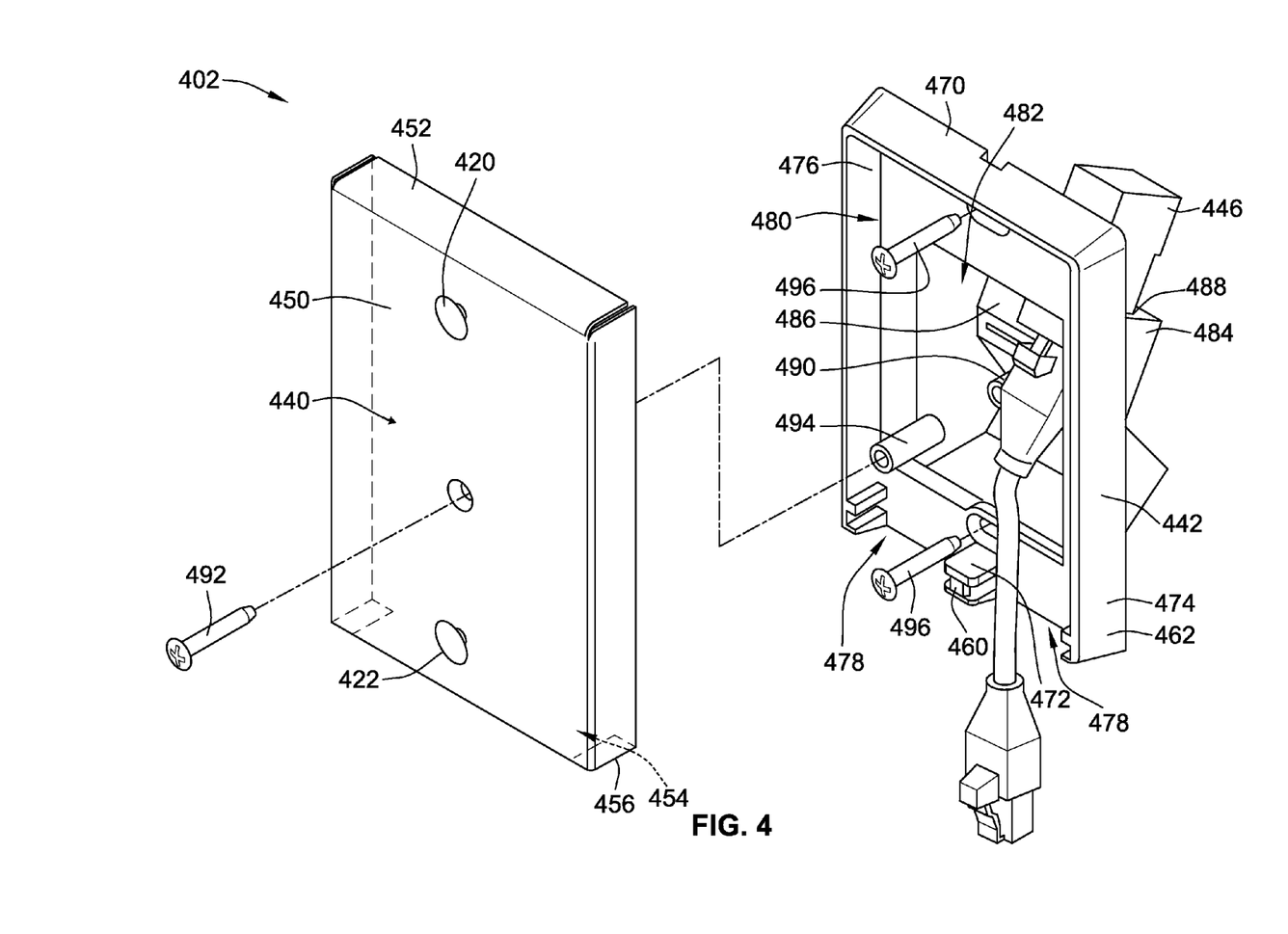
FIG. 4 is an exploded view of an alternative faceplate assembly.

FIG. 4 is an exploded view of an alternative faceplate assembly 402. The faceplate assembly 402 includes a cover plate 440 and a subplate 442. The cover plate 440 is substantially similar to the cover plate 140 (shown in FIG. 2). The subplate 442 is configured to hold a single modular jack 446 therein.

The cover plate 440 includes a front wall 450 and a rim 452 surrounding a perimeter of the front wall 450. Mounting posts 420, 422 extend forward from the front wall 450. The mounting posts 420, 422 are configured to be received in the keyholes 118 (shown in FIG. 1) of the IP phone 104 (shown in FIG. 1). The rim 452 includes a rim opening 454 through a bottom 456 of the rim 452.

The subplate 442 includes an end wall 460 and a lip 462 surrounding a perimeter of the end wall 460. The end wall 460 is generally planar and is rectangular in shape, however other shapes are possible in alternative embodiments. The lip 462 extends forward from the end wall 460 and includes a top 470, a base 472 and opposite sides 474, 476. The lip 462 may be generally perpendicular with respect to the end wall 460. The base 472 defines a bottom portion of the lip 462 and extends between the sides 474, 476.

The lip 462 includes one or more base openings 478 through the base 472. The base openings 478 are configured to receive the patch cord 110 (shown in FIG. 1) therethrough. Alternatively, the base openings 478 may receive other types of connectors, such as a fiber optic connector, therein. The base openings 478 are aligned with the rim opening 454 when the cover plate 440 is coupled to the subplate 442. The openings 454, 478 provide access to the interior of the faceplate assembly 402.

The subplate 442 includes a chamber 480 defined by the lip 462 and the end wall 460. The chamber 480 is positioned forward of the end wall 460. The chamber 480 provides a routing space for routing the patch cords 110 from the modular jack 446 to the base openings 478 in the base 472.

The end wall 460 includes an end wall opening 482 therethrough. The end wall opening 482 is substantially centered on the end wall 460. The end wall 460 includes a bracket 484 aligned with, and rearward of, the end wall 460. The bracket 484 supports the modular jack 446. The bracket 484 recesses the modular jack 446 behind the end wall 460. The bracket 484 has a mount wall 486 with a single jack opening 488 therethrough. The jack opening 488 is configured to receive the modular jack 446. In the illustrated embodiment, the mount wall 486 is angled non-parallel with respect to the end wall 460 to angle the modular jack 446 with respect to the end wall 460. For example, the modular jack 446 is angled at least partially downward toward the base openings 478 for easy routing of the patch cord 110 to the modular jack 446.

The subplate 442 includes a securing feature 490. A fastener 492 is used to secure the cover plate 440 to the subplate 442. For example, the fastener 492 may be a threaded fastener, and the securing feature 490 may be a threaded bore. When the fastener 492 is coupled to the securing feature 490, the cover plate 440 is coupled to the subplate 442. Optionally, a spacer 494 may be provided between the cover plate 440 and the securing feature 490 for structural support of the cover plate 440. In an exemplary embodiment, the fastener 490 is secured to the cover plate 440 and the subplate 442 at a central location of the faceplate assembly 402. Other locations are possible in alternative embodiments.

During assembly, the subplate 442 is mounted to the receptacle box 144 (shown in FIG. 3) using fasteners 496. Alternative fastening means are possible in alternative embodiments. The bracket 484 extends rearward from the end wall 460 and is received in the receptacle box 144. The bracket 484 is recessed from the end wall 460. The bracket 484 supports the modular jack 446 and recesses the modular jack 446 behind the end wall 460. The mount wall 486 is oriented non-parallel with respect to the end wall 460 and generally faces the base openings 478. As such, the patch cord 110 may be routed from the modular jack 446 to the base openings 478 while maintaining proper cable dress and bend radius for the patch cord 110. The chamber 480 provides a space for the patch cord 110 to be routed to the base openings 478.

During assembly, once the subplate 442 is mounted to the receptacle box 144 and the patch cord 110 is coupled to the modular jack 446, the cover plate 440 may be coupled to the subplate 442. The fastener 492 is loaded through the securing feature 490 and the spacer 494, and is aligned with the securing feature 490. The fastener 492 is coupled to the securing feature 490 to secure the cover plate 440 to the subplate 442. When the cover plate 440 is coupled to the subplate 442, the rim 452 surrounds the lip 462. The rim opening 454 is aligned with the base openings 478. The patch cord 110 passes through both the rim opening 454 and the base openings 478. The cover plate 440 covers the chamber 480 and provides a finished face for the faceplate assembly 402.

The mounting posts 420, 422 extend from the finished face of the cover plate 440 for receiving the IP phone 104 (shown in FIG. 1). When the IP phone 104 is mounted to the cover plate 440, the faceplate assembly 402 supports the IP phone 104 and allows the IP phone 104 to be wall mounted. The IP phone 104 is configured to be mounted to the mounting posts 420, 422 without the need for additional hardware or mounting brackets external of, and in addition to, the faceplate assembly 402. Rather, the IP phone 104 is directly connected to the faceplate assembly 402. The faceplate assembly 402 has a relatively thin or low profile. Additionally, by having the patch cord 110 routed through the bottom of the faceplate assembly 402, the patch cord 110 is positioned at the base of the IP phone 104, which is the location of the modular jacks 114 (shown in FIG. 1) of the IP phone 104. The IP phone 104 may sit flush with the front wall 450, as opposed to having to be elevated off the front wall 450 to accommodate routing of patch cord 110 through the front wall 450.

Figure 5:
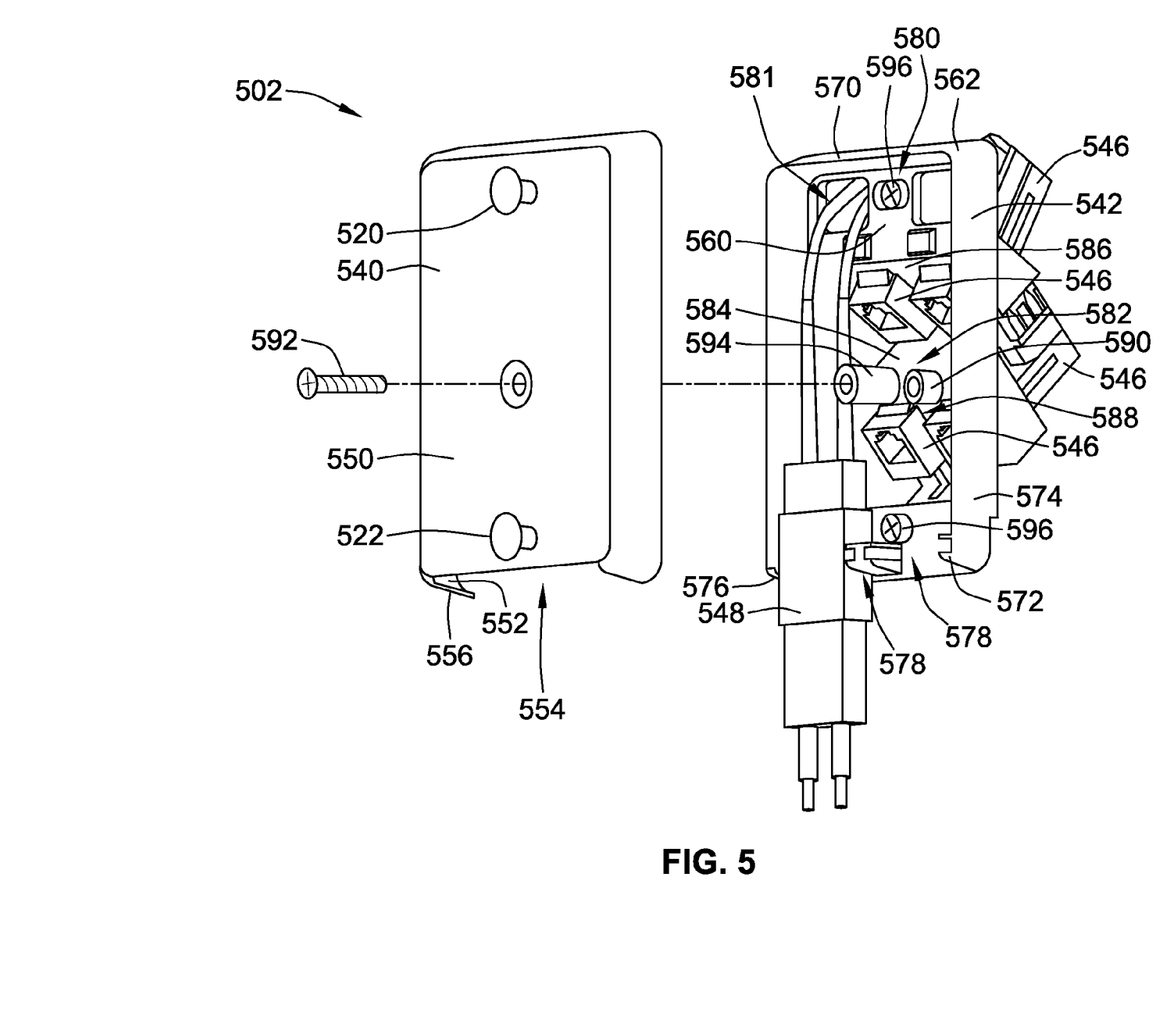
FIG. 5 is an exploded view of another alternative faceplate assembly.

FIG. 5 is an exploded view of another alternative faceplate assembly 502. The faceplate assembly 502 includes a cover plate 540 and a subplate 542. The cover plate 540 is substantially similar to the cover plate 140 (shown in FIG. 2). The subplate 542 is configured to hold four modular jacks 546 therein. The subplate 542 is also configured to hold one or more fiber optic connectors 548. It is realized that any combination of modular jacks 546 and fiber optic connectors 548 are possible. Additionally, the faceplate assembly, while having four modular jacks 546, may have less than four patch cords 110 (shown in FIG. 1) connected thereto. For example, less than all of the modular jacks 546 may be used at a time, depending on the particular end use application desired for the system. Additionally, the faceplate assembly 502 may be utilized without the fiber optic connector 548, but rather just utilized with one or more patch cords 110.

The cover plate 540 includes a front wall 550 and a rim 552 surrounding a perimeter of the front wall 550. Mounting posts 520, 522 extend forward from the front wall 550. The mounting posts 520, 522 are configured to be received in the keyholes 118 (shown in FIG. 1) of the IP phone 104 (shown in FIG. 1). The rim 552 includes a rim opening 554 through a bottom 556 of the rim 552.

The subplate 542 includes an end wall 560 and a lip 562 surrounding a perimeter of the end wall 560. The end wall 560 is generally planar and is rectangular in shape, however other shapes are possible in alternative embodiments. The lip 562 extends forward from the end wall 560 and includes a top 570, a base 572 and opposite sides 574, 576. The lip 562 may be generally perpendicular with respect to the end wall 560. The base 572 defines a bottom portion of the lip 562 and extends between the sides 574, 576.

The lip 562 includes one or more base openings 578 through the base 572. The base openings 578 are configured to receive the patch cords 110 (shown in FIG. 1) therethrough. More than one patch cord 110 may be routed through a particular base opening 578. In the illustrated embodiment, one of the base openings 578 receives the fiber optic connector 548, therein and holds the fiber optic connector 548. The base openings 578 are aligned with the rim opening 554 when the cover plate 540 is coupled to the subplate 542. The rim and base openings 554, 578 provide access to the interior of the faceplate assembly 502.

The subplate 542 includes a chamber 580 defined by the lip 562 and the end wall 560. The chamber 580 is positioned forward of the end wall 560. The chamber 580 provides a routing space for routing the patch cords 110 from the modular jack 546 to the base openings 578 in the base 572. The chamber 580 provides a routing space for cables of the fiber optic connector 548 to be routed therethrough. The subplate 542 includes one or more fiber optic cable openings 581 that allow the cables of the fiber optic connector 548 to pass from the chamber 580 to the receptacle box 144 (shown in FIG. 3).

The end wall 560 includes an end wall opening 582 therethrough. The end wall opening 582 is substantially centered on the end wall 560. The end wall 560 includes a bracket 584 aligned with, and rearward of, the end wall 560. The bracket 584 supports the modular jacks 546. The bracket 584 recesses the modular jacks 546 behind the end wall 560. The bracket 584 has one or more mount walls 586 with one or more jack openings 588 therethrough. The jack openings 588 are configured to receive the modular jacks 546. In the illustrated embodiment, two mount walls 586 are provided, with each mount wall 586 having two jack openings 588. The mount walls 586 are angled non-parallel with respect to the end wall 560 to angle the modular jacks 546 with respect to the end wall 560. For example, the modular jacks 546 are angled at least partially downward toward the base openings 578 for easy routing of the patch cords 110 to the modular jack 546.

The subplate 542 includes a securing feature 590. A fastener 592 is used to secure the cover plate 540 to the subplate 542. For example, the fastener 592 may be a threaded fastener, and the securing feature 590 may be a threaded bore. When the fastener 592 is coupled to the securing feature 590, the cover plate 540 is coupled to the subplate 542. Optionally, a spacer 594 may be provided between the cover plate 540 and the securing feature 590 for structural support of the cover plate 540. In an exemplary embodiment, the fastener 592 is secured to the cover plate 540 and the subplate 542 at a central location of the faceplate assembly 502. Other locations are possible in alternative embodiments.

During assembly, the subplate 542 is mounted to the receptacle box 144 using fasteners 596. Alternative fastening means are possible in alternative embodiments. The bracket 584 extends rearward from the end wall 560 and is received in the receptacle box 144. The bracket 584 is recessed from the end wall 560. The bracket 584 supports the modular jacks 546 and recesses the modular jacks 546 behind the end wall 560. The mount walls 586 are oriented non-parallel with respect to the end wall 560 and generally faces the base openings 578. As such, the patch cords 110 may be routed from the modular jack 546 to the base openings 578 while maintaining proper cable dress and bend radius for the patch cords 110. The chamber 580 provides a space for the patch cords 110 to be routed to the base openings 578.

During assembly, once the subplate 542 is mounted to the receptacle box 144 and the patch cords 110 coupled to the modular jacks 546, the cover plate 540 may be coupled to the subplate 542. The fastener 592 is loaded through the securing feature 590 and the spacer 594, and is aligned with the securing feature 590. The fastener 592 is coupled to the securing feature 590 to secure the cover plate 540 to the subplate 542. When the cover plate 540 is coupled to the subplate 542, the rim 552 surrounds the lip 562. The rim opening 554 is aligned with the base openings 578. The patch cords 110 pass through both the rim and base openings 554, 578. The cover plate 540 covers the chamber 580 and provides a finished face for the faceplate assembly 502.

The mounting posts 520, 522 extend from the finished face of the cover plate 540 for receiving the IP phone 104 (shown in FIG. 1). When the IP phone 104 is mounted to the cover plate 540, the faceplate assembly 502 supports the IP phone 104 and allows the IP phone 104 to be wall mounted. The IP phone 104 is configured to be mounted to the mounting posts 520, 522 without the need for additional hardware or mounting brackets external of, and in addition to, the faceplate assembly 502. Rather, the IP phone 104 is directly connected to the faceplate assembly 502. The faceplate assembly 502 has a relatively thin or low profile. Additionally, by having the patch cords 110 and fiber optic connector 548 routed through the bottom of the faceplate assembly 502, the patch cords 110 and fiber optic connector 548 are positioned at the base of the IP phone 104, which is the location of the modular jacks 114 (shown in FIG. 1) of the IP phone 104. The IP phone 104 may sit flush with the front wall 550, as opposed to having to be elevated off the front wall 550 to accommodate routing of patch cord 110 through the front wall 550.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A faceplate assembly comprising:
 a cover plate having a front wall and a rim surrounding a perimeter of the front wall, the rim having a rim opening therethrough, the front wall having a pair of mounting posts extending therefrom, the mounting posts being configured to be received in keyholes of a phone to support the phone; and
 a subplate configured to be mounted to a wall outlet, the subplate having an end wall and a base with a base opening therethrough, the subplate being configured to hold a modular jack, wherein the cover plate is coupled to the subplate such that the rim and base openings are aligned with one another and are configured to receive a patch cord therethrough.

2. The faceplate assembly of claim 1, wherein the front wall is planar and extends between a top and a bottom, the mounting posts being positioned proximate to the top and the bottom, the rim opening being provided at the bottom.

3. The faceplate assembly of claim 1, wherein the mounting posts extend outward from the front wall, the mounting posts including posts and heads at ends of the posts, the heads being larger than the posts.

4. The faceplate assembly of claim 1, wherein the subplate is configured to be mounted to a receptacle box in a wall, the subplate supporting the cover plate for wall mounting the phone.

5. The faceplate assembly of claim 1, wherein the subplate includes a bracket recessed from the end wall, the bracket being configured to hold the modular jack.

6. The faceplate assembly of claim 1, wherein the subplate includes a bracket recessed from the end wall, the bracket having a mount wall with a jack opening therethrough, the jack opening being configured to receive the modular jack, the mount wall being angled non-parallel with respect to the end wall to angle the modular jack non-perpendicular with respect to the end wall.

7. The faceplate assembly of claim 1, wherein the subplate includes a lip surrounding a perimeter of the end wall, the lip extending forward from the end wall, the base defining a bottom portion of the lip, the lip defining a chamber forward of the end wall, the chamber providing a routing space for routing the patch cord from the modular jack to the base opening.

8. The faceplate assembly of claim 1, wherein the rim and base openings are provided at a bottom of the faceplate assembly below the mounting posts.

9. The faceplate assembly of claim 1, wherein the cover plate includes a fastener bore therethrough, the fastener bore being substantially centrally located on the front wall, the faceplate assembly further comprising a fastener received in the fastener bore and coupled to the subplate to secure the cover plate to the subplate.

10. The faceplate assembly of claim 1, wherein the subplate includes a bracket recessed from the end wall, the bracket being configured to hold a plurality of modular jacks, each modular jack receiving a corresponding patch cord, the rim and base openings being configured to receive each of the patch cords therethrough.

11. An internet protocol (IP) phone system comprising:
 a modular jack;
 a patch cord configured to be coupled to the modular jack; and
 a faceplate assembly configured to be mounted to a wall outlet, the faceplate assembly comprising:
 a subplate configured to be mounted to the wall outlet, the subplate having an end wall and a base with a base opening therethrough, the subplate holding the modular jack; and
 a cover plate coupled to the subplate, the cover plate having a front wall and a rim surrounding a perimeter of the front wall, the rim having a rim opening therethrough, the front wall having a pair of mounting posts extending therefrom, the mounting posts being configured to be received in keyholes of an IP phone to support the IP phone, wherein the rim opening is aligned with the base opening such that the rim and base openings receive the patch cord therethrough.

12. The system of claim 11, wherein the front wall is planar and extends between a top and a bottom, the mounting posts being positioned proximate to the top and the bottom, the rim opening being provided at the bottom.

13. The system of claim 11, wherein the mounting posts extend outward from the front wall, the mounting posts including posts and heads at ends of the posts, the heads being larger than the posts.

14. The system of claim 11, wherein the subplate is configured to be mounted to a receptacle box in a wall, the subplate supporting the cover plate for wall mounting the IP phone.

15. The system of claim 11, wherein the subplate includes a bracket recessed from the end wall, the bracket holding the modular jack.

16. The system of claim 11, wherein the subplate includes a bracket recessed from the end wall, the bracket having a mount wall with a jack opening therethrough, the jack opening receiving the modular jack, the mount wall being angled non-parallel with respect to the end wall to angle the modular jack such that the modular jack receives the patch cord along a mating axis non-perpendicular with respect to the end wall.

17. The system of claim 11, wherein the subplate includes a lip surrounding a perimeter of the end wall, the lip extending forward from the end wall, the base defining a bottom portion of the lip, the lip defining a chamber forward of the end wall, the chamber providing a routing space for routing the patch cord from the modular jack to the base opening.

18. The system of claim 11, wherein the rim and base openings are provided at a bottom of the faceplate assembly below the mounting posts.

19. The system of claim 11, wherein the cover plate includes a fastener bore therethrough, the fastener bore being substantially centrally located on the front wall, the faceplate assembly further comprising a fastener received in the fastener bore and coupled to the subplate to secure the cover plate to the subplate.

20. The system of claim 11, further comprising a plurality of modular jacks and a plurality of patch cords, the subplate including a bracket recessed from the end wall, the bracket holding the plurality of modular jacks, each modular jack receiving a corresponding patch cord, the rim and base openings being configured to receive each of the patch cords therethrough.

* * * * *